US006428020B1

(12) United States Patent
Steadman

(10) Patent No.: US 6,428,020 B1
(45) Date of Patent: Aug. 6, 2002

(54) WHEELED CONVEYANCE

(76) Inventor: William David Steadman, 2166 SE. Pyramid Rd., Port Saint Lucie, FL (US) 34952

( * ) Notice: Subject to any disclaimer, the term of this patent is extended or adjusted under 35 U.S.C. 154(b) by 0 days.

(21) Appl. No.: 09/530,631

(22) PCT Filed: Oct. 23, 1998

(86) PCT No.: PCT/GB98/03157

§ 371 (c)(1), (2), (4) Date: Apr. 26, 2000

(87) PCT Pub. No.: WO99/21524

PCT Pub. Date: May 6, 1999

Related U.S. Application Data

(60) Provisional application No. 60/063,554, filed on Oct. 28, 1997.

(51) Int. Cl.[7] ................................................ B62B 11/00

(52) U.S. Cl. ............................... 280/47.25; 280/47.34; 280/647

(58) Field of Search .......................... 280/47.17, 47.18, 280/47.2, 47.25, 47.34, 43.1, 647, 650, DIG. 10

(56) References Cited

U.S. PATENT DOCUMENTS

| | | | | | |
|---|---|---|---|---|---|
| 3,142,351 | A | | 7/1964 | GREEN | 280/DIG. 10 |
| 4,455,029 | A | * | 6/1984 | Taylor | 280/5.28 |
| 4,512,588 | A | * | 4/1985 | Cox | 280/5.26 |
| 4,962,942 | A | * | 10/1990 | Barnett et al. | 280/5.28 |
| 5,263,547 | A | * | 11/1993 | Alber | 180/8.2 |
| 5,964,473 | A | * | 10/1999 | Degonda et al. | 280/250.1 |
| 6,047,979 | A | * | 4/2000 | Kraft et al. | 280/250.1 |
| 6,135,222 | A | * | 10/2000 | Furukawa | 180/65.5 |

FOREIGN PATENT DOCUMENTS

| | | |
|---|---|---|
| GB | 2 111 000 A | 6/1983 |

* cited by examiner

*Primary Examiner*—Avraham Lerner
*Assistant Examiner*—L. Lum
(74) *Attorney, Agent, or Firm*—Watts, Hoffman, Fisher & Heinke Co., L.P.A.

(57) ABSTRACT

A wheelchair having a track along which front wheels are slidably moveable between a conventional forward position and a rearward position in which the conventional rear wheels are lifted off the ground thereby to permit the rear wheels to be moved up a curb.

57 Claims, 8 Drawing Sheets

WHEELED CONVEYANCE

This application claims the benefit of Provisional application Ser. No. 60/063,554 filed Oct. 28, 1997.

This invention concerns a wheeled conveyance, and particularly but not exclusively a manually pushable wheeled conveyance, and especially a wheelchair.

Problems are often encountered with wheelchairs and similar conveyances when climbing a step or onto a curb. Whilst is generally relatively easy to raise the front wheel of the wheelchair to locate it on a step, difficulties are often encountered, and particularly when a heavy person is carried, in subsequently pushing the wheelchair up the step. Difficulties can also be encountered by wheelchair users when transferring from a wheelchair to an adjacent car. This is particularly due to the generally large rear wheel of the wheelchair which comes between a user and a car such that the user has to manoeuvre around the wheel.

According to the present invention there is provided a wheeled conveyance, the conveyance comprising a first main wheel arrangement which is located towards the in use rear of the conveyance, a second wheel arrangement slidably movable between a first conventional position in front of the main wheel arrangement and a second more rearward position wherein the second wheel arrangement is lower than the first wheel arrangement to be ground engageable in preference to the first wheel arrangement.

The conveyance preferably comprises a ground engaging member, which desirably comprises a third wheel arrangement, and is located towards the front of the conveyance. The ground engaging member is preferably arranged so as to be ground engageable at least when the second wheel arrangement is in the second position. The ground engaging member is preferably arranged to be generally clear of the ground when the second wheel arrangement is in the first position.

Any or all of the first, second and third wheel arrangements preferably comprise a pair of wheels, with each of the pair located towards a respective side of the conveyance.

The conveyance preferably comprises a frame upon which the wheel arrangements are mounted.

The second wheel arrangement is preferably slidably mounted on a track, which track is mounted on the frame. The track is preferably pivotally mounted on the frame and movable between a first condition aligned generally horizontally or upwardly inclined towards the rear of the conveyance, and a second condition inclined downwardly towards the rear of the conveyance.

Means are preferably provided for locking the track in the second condition. The locking means may be arranged to be automatically disengaged upon the second wheel arrangement reaching the second position.

The locking means may comprise a ratchet member engageable with a pivoted sprung member, and against which sprung member the second wheel arrangement is preferably engageable to cause disengagement of the locking arrangement.

The track may be urged towards the first condition. The track may be pivotally mounted on the frame at a point towards the front of the frame, and a first resilient means may extend between the track and the frame at a location on the frame spaced from the pivotal mounting so as to urge the track towards the first condition.

The second wheel arrangement may be urged towards to the first position, and the urging may be greater when the track is in the second condition.

Alternatively the track may be pivotally mounted on an arrangement which is movably mounted on the frame. The mounting arrangement may be pivotally mounted on the frame, and/or of variable length. First locking means may be provided for locking the arrangement against pivotal movement on the frame. Second locking means may be provided for locking the length of the arrangement.

The first and/or second locking means are preferably operable by a foot pedal, which pedal preferably permits the track to be pivoted as required.

The second wheel arrangement may be connected to the frame via a second resilient means to provide said urging of said arrangement towards the first position. An actuating member may be provided connected to the track, and engageable by a person pushing the conveyance to move the track into the second condition. The actuating member preferably extends rearwardly from the conveyance. The actuating member may be operable by a person's foot. The actuating member may comprise a plate, which may be foldable, and/or which may have a generally chevron shape in plan view.

The second resilient means may be mounted on the actuating member such that the resilient means is stretched further away from a relaxed position when the track is moved to the second condition.

An end of the second resilient means spaced from the actuating member may slidably mount line means which extends from a first point towards the front of the frame via said slidable mounting on the second resilient means, to a slidable mounting at a second point towards the front of the frame, to connect to the second wheel arrangement. Alternatively a further resilient means may mount said line means.

Means may be provided for locking the second wheel arrangement in the first position, and said locking means may be automatically actuable upon the second wheel arrangement moving to the first position. The locking means may comprise a sprung finger.

Means are preferably provided for selectively releasing the locking means, and said release means may be operable by a person pushing the conveyance. Said release means may comprise line means extending from the sprung finger to a handle.

Where the second wheel arrangement comprises a pair of wheels, a respective track and other corresponding components are preferably provided for each wheel. Where a pair of actuating members are provided, an engagement member is preferably provided extending therebetween. Where the conveyance is collapsible a hinge or other arrangement may be provided in said engagement member to permit folding thereof.

The conveyance frame preferably comprises two parts which are selectively braced apart in an in use condition. A seating arrangement is preferably provided which is selectively mountable on the frame. The seating arrangement is preferably substantially rigid at least in a transverse direction to brace the frame parts apart. The seating arrangement preferably comprises a base, back, and desirably also arm rests, and means for retaining said components in required relative positions. The seating arrangement preferably also provides handles for the conveyance, which handles may be integral with the arm rests.

The invention further provides a wheelchair in the form of a conveyance with a two part frame according to any of the features of the above paragraph.

The invention also provides a wheelchair in the form of a conveyance according to any of the preceding nineteen paragraphs.

Preferably at least the first and second wheel arrangements respectively comprise a pair of spaced wheels.

Each track and respective actuation member are preferably co-existensive, and foot rests preferably extend from the front of each of the tracks. The ground engagement member preferably comprises a pair of third wheels, and each third wheel is preferably mounted on a respective foot rest and to extend therebeneath. The tracks are preferably pivotally mounted to the frame, and generally at the connection between the tracks and the foot rests such that upon the tracks being moved to the second condition the foot rests are raised up.

In a particular embodiment, the first wheels are releasably mountable on the frame. Power means may be provided for moving the second wheels, which power means may be actuable by a person on the wheelchair.

Embodiments of the present invention will now be described by way of example only and with reference to the accompanying drawings, in which.

Figure 1:
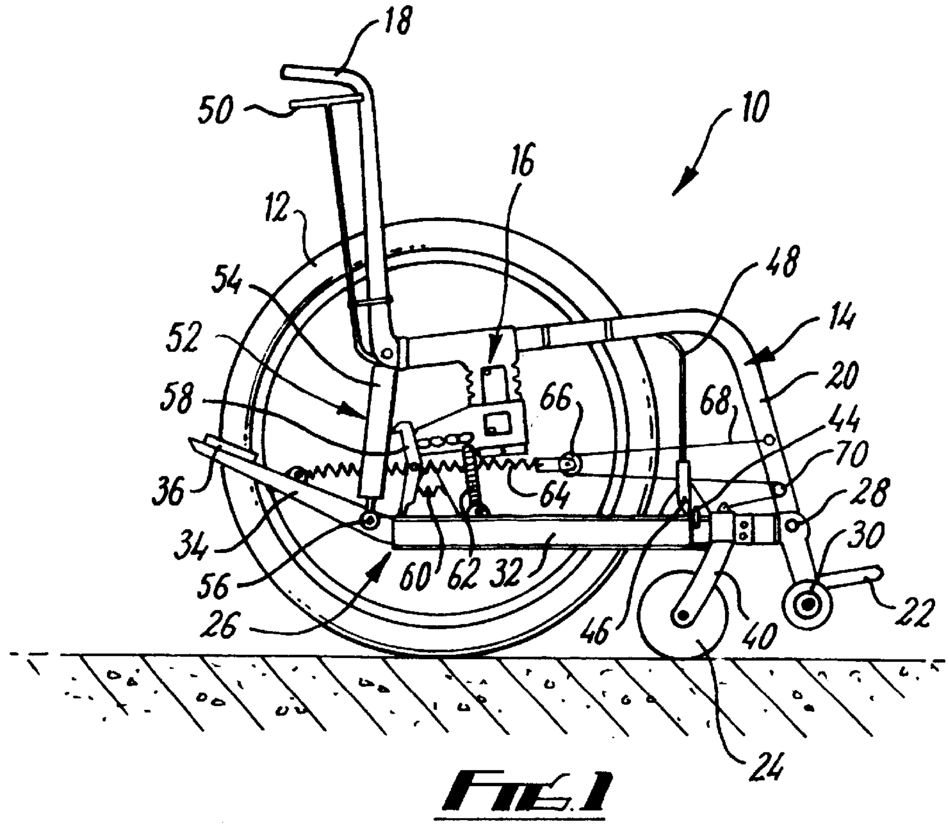
FIGS. 1–4 are diagrammatic side views of a first wheelchair according to the invention, with the nearest rear wheel of the wheelchair removed for clarity, the figures showing the wheelchair sequentially moving up a step.
Figure 2:
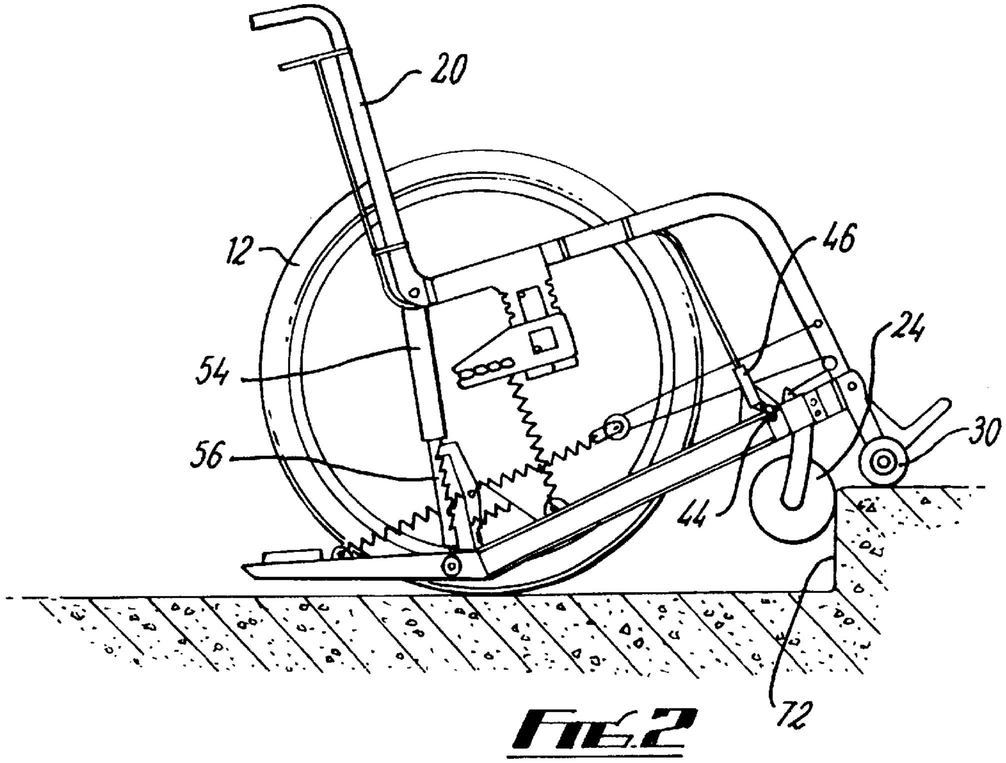
Figure 3:
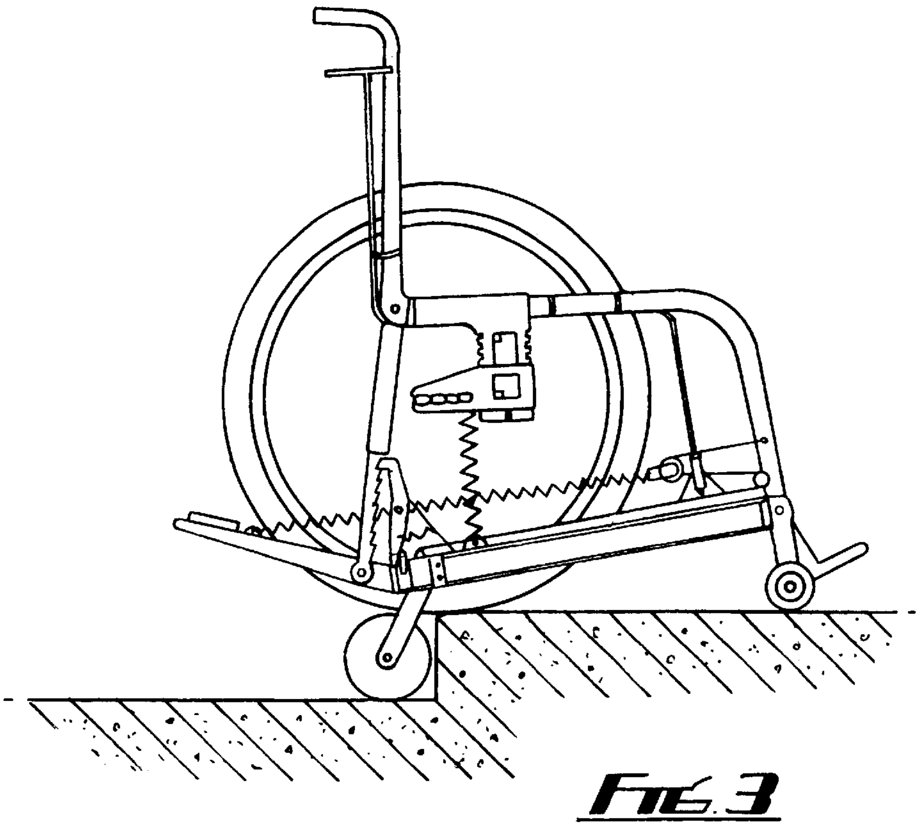
Figure 4:
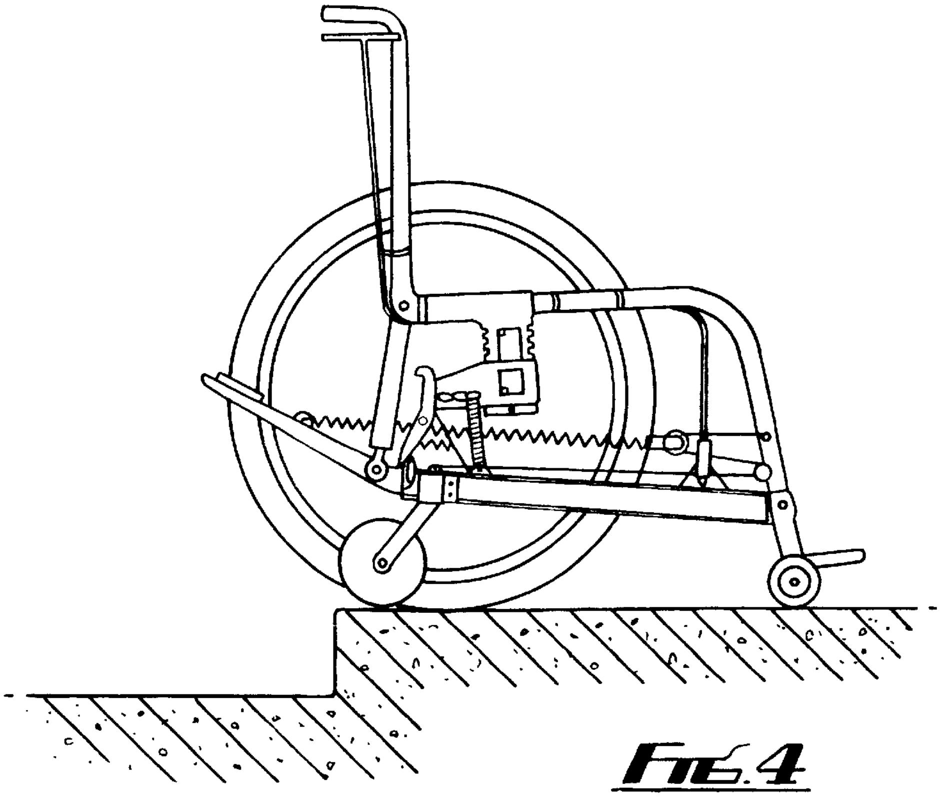
Figure 5:
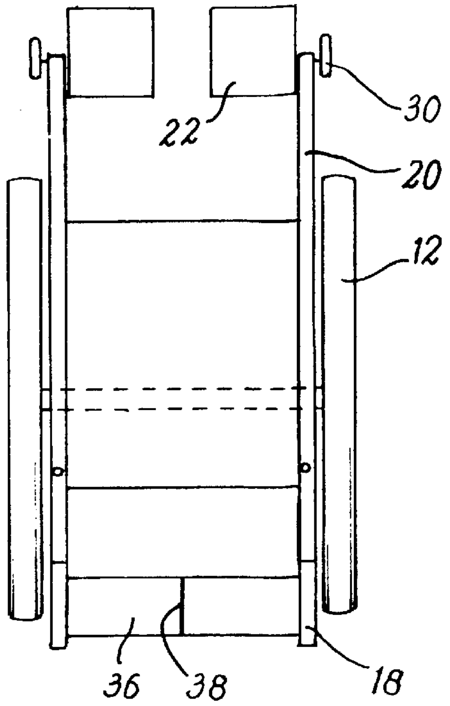
FIG. 5 is a diagrammatic plan view of the wheelchair of FIGS. 1–4.
Figure 6:
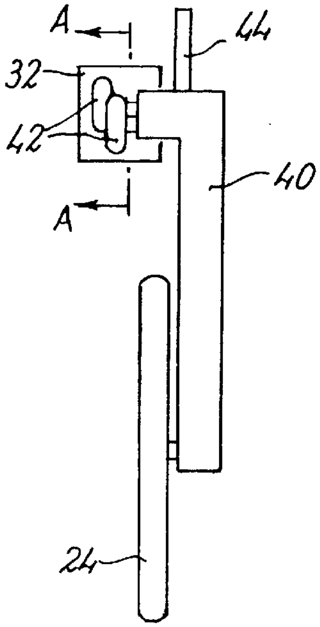
FIG. 6 is a diagrammatic end view of part of the wheelchair of FIGS. 1–4.

FIGS. 1 to 7 of the drawings show a wheelchair 10 part of which is of conventional configuration, and comprises two large rear wheels 12 mountable on a frame 14. The wheels 12 are adjustably mountable on the frame 14 by a conventional arrangement 16 permitting the wheels 12 to be mounted at different heights and rearward spacing, dependent on the size of a person to be carried. A conventional arrangement (not shown) is provided for bracing the wheels 12, and hence the two sides of the wheelchair 10, apart. This arrangement is such as to permit the wheelchair 10 to be folded to an out of use condition with one wheel 12 lying substantially on the other.

The wheelchair 10 has a generally standard configuration with a pair of rearwardly pointing handles 18 provided on the ends of two frame members 20 which extend respectively one on either side of the wheelchair 10, immediately inside of the respective wheel 12. Foot rests 22 are provided in a conventional configuration and standard front wheels 24 are provided with a mounting which permits then to swivel.

The wheelchair 10 however comprises a sub-frame 26 which is identical on each side of the wheelchair 10, and therefore only one side will be described. The sub-frame 26 is pivotally mounted at 28 to the respective frame member 20 towards the lower end thereof. Extending from the pivotal mounting 28 and comprising part of the sub-frame 26, is the foot rest 22. An auxiliary wheel 30 is mounted on the outside of the foot rest 22 to extend therebeneath.

Extending rearwardly from the mounting 28 is a track 32 in the form of a length of channel section open towards the outer side of the wheelchair 10. Extending from the rear end of the track 32 is an elongate actuating member 34. The elongate member 34 is inclined gently upwardly relative to the track 32. The two respective elongate members 34 are joined by a plate 36. A hinge 38 is provided midway along the length of the plate 36 to permit same to fold into two when the wheelchair 10 is collapsed in a conventional manner.

Figure 7:
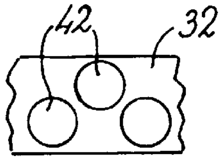
FIG. 7 is a diagrammatic cross-sectional view on the line A—A of FIG. 6.
Figure 8:
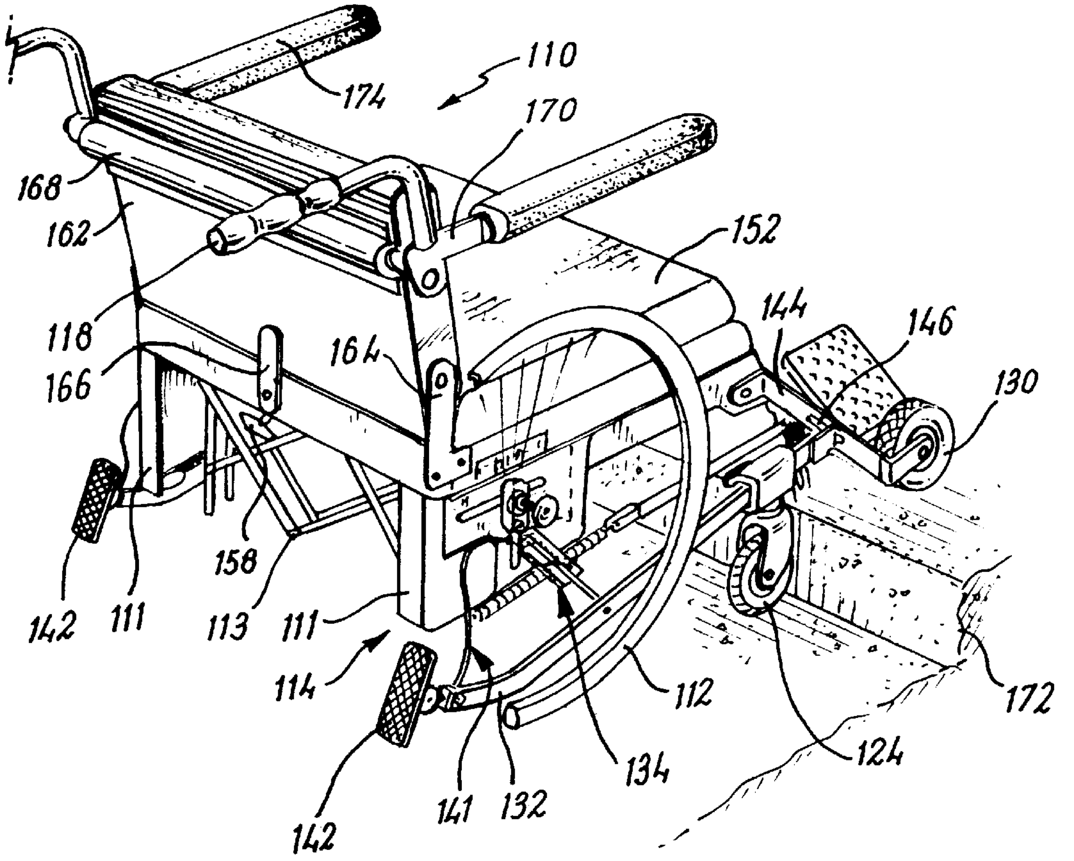
FIG. 8 is a diagrammatic partially removed perspective rear view of a second wheelchair according to the invention.
Figure 9:
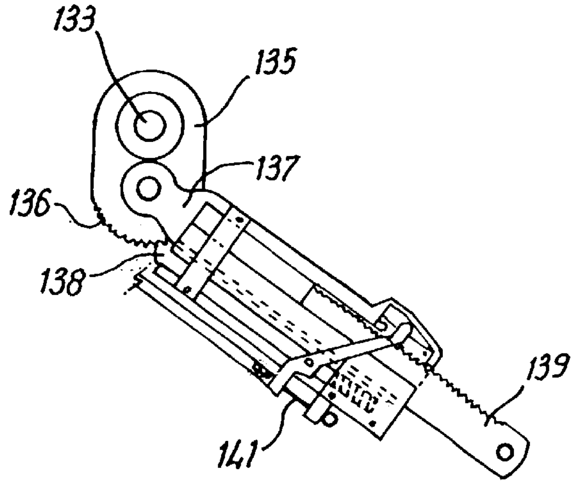
FIG. 9 is a diagrammatic side view of part of the apparatus of FIG. 8.
Figure 10:
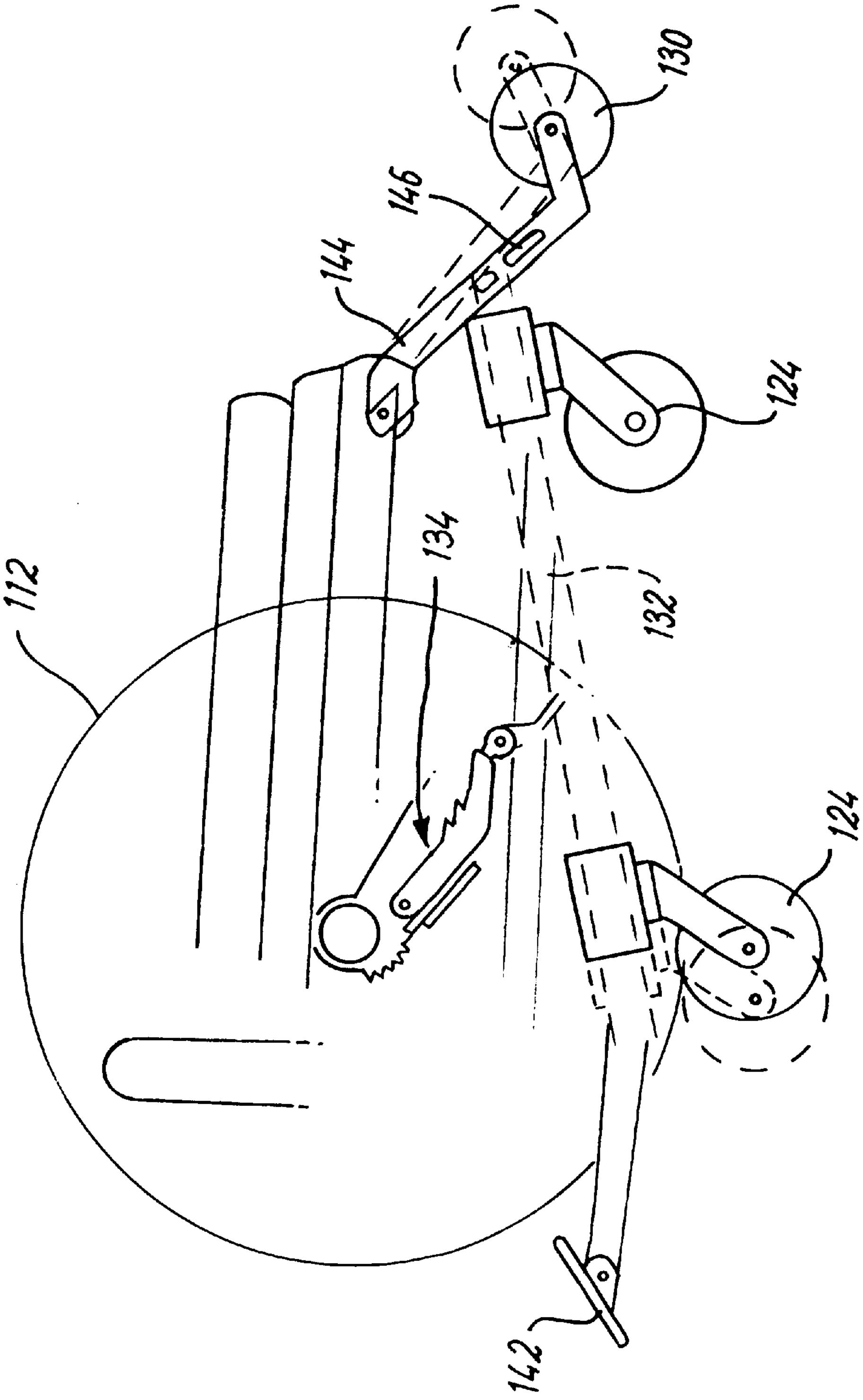
FIG. 10 is a diagrammatic side view of the apparatus of FIG. 8 illustrating different configurations of the wheels thereof.
Figure 11:
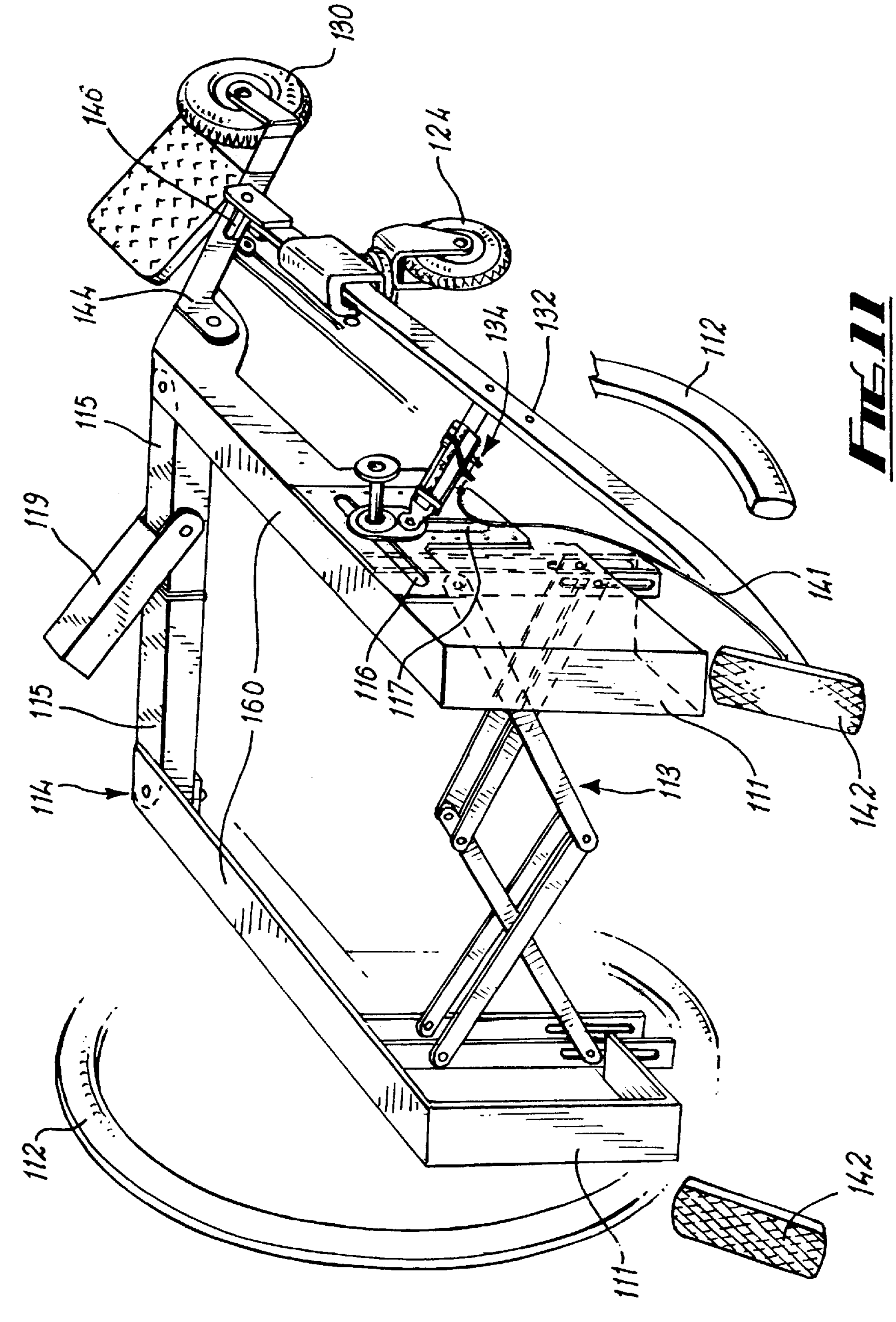
FIG. 11 is a diagrammatic perspective rear view of part of the wheelchair of FIG. 8.
Figure 12:
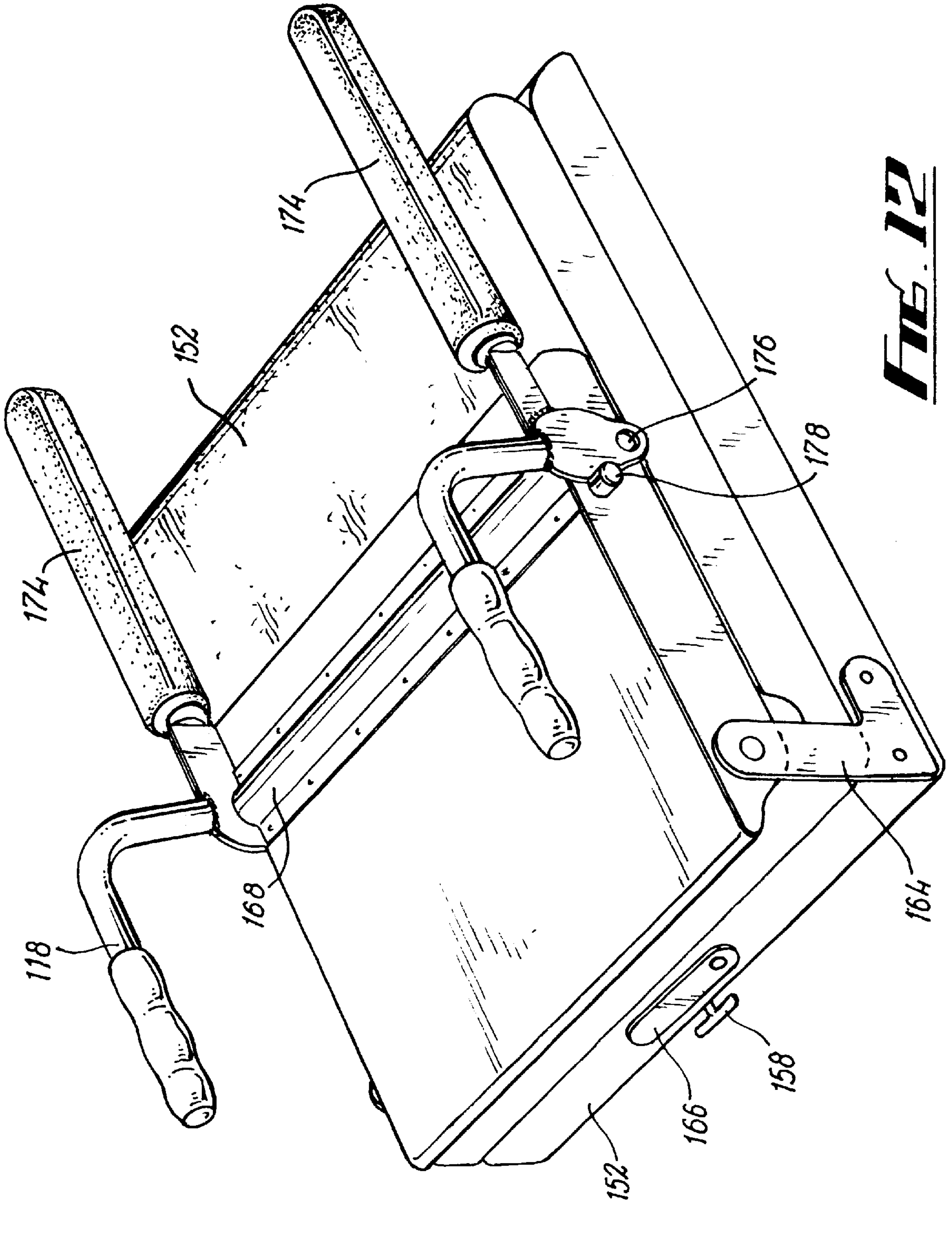
FIG. 12 is a diagrammatic rear perspective view of a different part of the wheelchair of FIG. 8.
Figure 13:
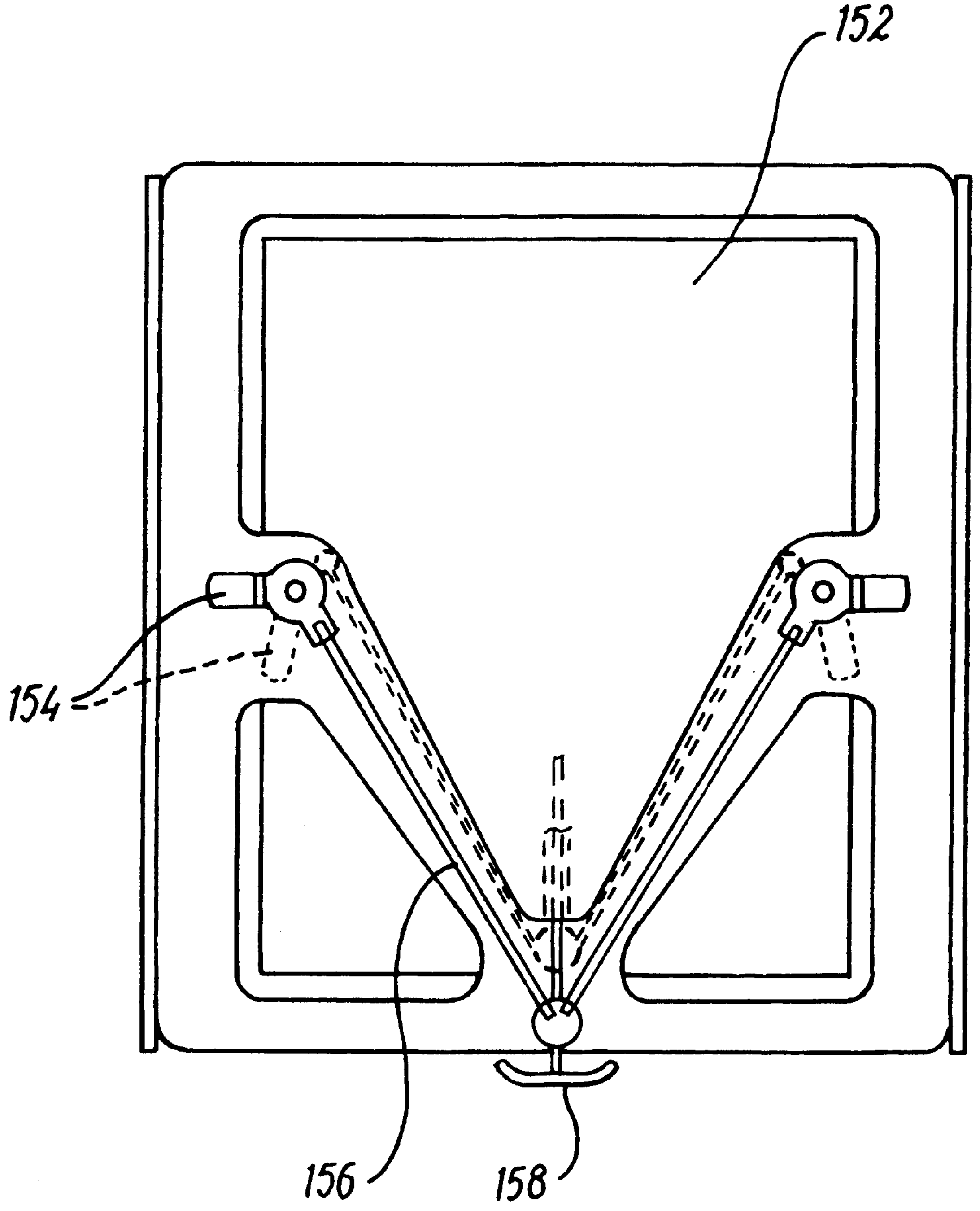
FIG. 13 is a diagrammatic view from beneath of the part of the wheelchair shown in FIG. 12.

The front wheel 24 is slidably mounted on the track 32 by a cranked mounting bracket 40 with an end which extends into the channel of the track 32 and mounts three guide wheels 42 thereon (FIG. 7). One upper and two lower guide wheels 42 are provided engageable respectively with the inside top and bottom faces of the track 32. A finger 44 extends upwardly from the bracket 40 and is engageable with a sprung latch 46 mounted on the frame. The latch 46 is arranged so as to retain the bracket 40 to the right hand side thereof as shown in FIGS. 1 to 4, until the latch 46 is released, and also to permit the bracket 40 and particularly the finger 44 to pass thereby if moving from the left hand side to become retained thereby. A wire 48 extends from the latch 46 to a handle 50 extending below a one of the handles 18, to permit release of the latch 46 to allow the bracket 40 to move rearwardly along the track 32.

The end of the elongate member 34 is mounted to the frame 14 at the back of the seat part thereof by a ratchet arrangement 52. The arrangement 52 comprises a cylinder 54 pivotally extending from the frame 14, and from which a toothed member 56 is extendable. The free end of the member 56 is mounted to the elongate member 34 such that the elongate member 34 can be moved towards or away from the frame 14 by the member 56 moving in or out of the cylinder 54. A pivotal locking member 58 is provided adjacent the rear end of the track 32 and engageable with the teeth on the member 56. The member 58 is urged by a spring 60 to engage with the teeth on the member 56. The lower end of the member 58 is located such that when the bracket 40 moves to the far left hand end of the track 32 the finger 44 engages against the member 58 disengaging the same from the teeth on the member 56 to permit the member 56 to move into the cylinder 54. The teeth on the member 56 are arranged such that the member 56 can be pushed downwardly, but not upwardly, against the locking member 58. A further spring 62 extends between the arrangement 16 and the track 32 at a point on the latter spaced a short distance from the far left hand end. The spring 62 urges the track 32 upwardly.

A still further spring 64 is mounted at one end to the elongate member 34 adjacent the plate 36. The other end of the spring 64 mounts a freely rotatable pulley wheel 66. A length of wire extends from the frame 14 a short distance above the mounting 28, around the pulley wheel 66, around a further pulley wheel 68 mounted on the frame 14 adjacent the mounting 28, with the free end of the wire 66 mounted to the top of the bracket 40. The spring 64 urges the bracket 40 and hence the wheel 24 towards the front of the wheelchair 10. By virtue of the three runs of the wire 66, the spring 64 is only stretched a third of the distance of movement of the bracket 40.

In use, the wheelchair 10 can be used in a conventional configuration as shown in FIG. 1. In this arrangement the brackets 40 and hence wheels 24 are held in position by the finger 44 engaging against the sprung latch 46. When a step or curb 72 (FIG. 2) is reached, pressure is applied onto the plate 36 thereby pushing the elongate member 34 against the pressure of the spring 62 such that the locking member 58 engages with the teeth on the member 56 to retain the sub-frame 26 in a pivoted orientation relative to the frame 14.

The wheelchair 10 is tipped rearwardly to locate the auxiliary wheels 30 on the top of the step 72 with the front wheels 24 engaging against the step 72. The latch 46 is then released using the handle 50. The wheelchair 10 is pushed forward such that all of the wheelchair moves forward except the front wheels 24 which engage against the step and slide rearwardly along the track 32. During this time the rear of the wheelchair will rise up such that it will rest upon the front wheels 24 which by then are located towards the rear of the wheelchair 10.

When the bracket 40 reaches the far rearward end of the track 32 the finger 44 engages the locking member 58 to release the tooth member 58 such that it returns into the cylinder 54 and the sub-frame 26 returns to its original alignment relative to the frame 14. The wheelchair will come to rest at this time on the rear wheels 12 and it can be pushed further forward beyond the step 72 to the position shown in FIG. 4. The force exerted by the spring 62 will pull the sub-frame 26 upwards.

The front wheels 24 and hence the brackets 40 may slide forwards along the track 32 by virtue of the force exerted by the spring 64 or it may be necessary to tip the wheelchair 10 slightly backwards to rest on the rear wheels 12 such that the front wheels 24 can move forwards freely by virtue of the force exerted by the spring 64 through the wire 68. The wheelchair 10 will now have returned to the arrangement shown in FIG. 1 with the front wheels 24 acting in a conventional manner and the auxiliary wheels 30 again clear of the ground.

There is thus described a wheelchair which permits curbs and other steps to readily be climbed whilst substantially only requiring the extra movement of tipping the wheelchair rearwardly which is generally not a difficult task to perform. The wheelchair is relatively easy to use with only an additional handle. The wheelchair is of generally straightforward construction and can thus be inexpensively and robustly manufactured. Wheelchairs according to the invention can be collapsed in a conventional manner as is provided for by the hinge in the rear step.

A modified version of the invention is usable to provide improved access to and from a car for a wheelchair user. In this arrangement the rear wheels are removable and power means is provided to move the front wheels rearwardly along the track. With this arrangement when a person wishes to get into a car from a wheelchair, the wheelchair is stopped adjacent the car door. The front wheels are then moved rearwardly by the power means such that the wheelchair is supported by the auxiliary wheels at the front and the front wheels at the rear, with the main rear wheels spaced a short distance above the ground. In this alignment the person on the wheelchair can remove the rear wheel nearest the car prior to getting into the car.

This greatly alleviates the problem often encountered that a wheelchair user to get into the car must move around the large rear wheels and therefore move forwards out of the wheelchair. With the respective large wheel removed a person can simply slide from the wheelchair into the car. Once in the car the other large rear wheel can be removed if required to ease storage and transportation of the wheelchair.

Various other modifications may be made without departing from the scope of the invention. For instance in the alternative embodiment described above it may be possible to use ground engaging members other than wheels as the auxiliary support. The plate may have a generally chevron shape in plan view so as not to obstruct the feet of a person pushing the wheelchair. Rather than guide wheels, blocks of a low friction material such as nylon could be engageable with the track.

Different means could be provided for urging the front wheels forwards and/or the sub-frame upwards. For example, a spring or other resilient means could be provided within the cylinder engageable with the toothed member. Different means could be provided for holding the front wheel forward and/or holding the sub-frame in an inclined orientation. Whilst in the method described above the sub-frame is inclined prior to raising the auxiliary wheels onto the curb, these steps could readily be carried out in an opposite order.

FIGS. 8–13 of the drawings show a further wheelchair 110 which is similar in many aspects to the wheelchair 10. Two large rear wheels 112 are mounted on a frame 114. Horizontal and vertical slots 116 and 117 in the frame 114 permit the wheels 12 to be mounted at a required position and height.

The frame 114 is provided in two parts 111, one on each side of the wheelchair 110. The parts 111 are braced apart at the rear of the wheelchair by a collapsible scissor arrangement 113 comprising two pivotally connected X-shaped frames. The two parts 111 are braced apart at the front of the wheelchair 110 by a pair of pivotal arms 115 with a pivoted locking member 119 of downwardly open channel section which is locatable over the connection between the arms 115 to maintain them in a colinear alignment.

The wheelchair 110 is again provided with a track 132 on each side along which front wheels 124 are slidably movable. The track 132 is mounted about the axis 133 of the wheels 112 by an arrangement 134. The arrangement 134 comprises a bracket 135 extending around the axis 133. A lower radiused part of the bracket 135 is provided with downwardly pointing teeth. A frame 137 is pivotally mounted about a horizontal axis on the plate 135 beneath the wheel axis 133.

A pawl 138 is mounted on the frame 137 so as to be selectively engageable with the teeth 136. The frame 137 also slidably mounts a toothed bar 139, the free end of which pivotally mounts the track 132. A further pawl 140 is provided on the frame 137 which is selectively engageable with the teeth on the bar 139 to prevent sliding movement thereof. Both pawls 138,140 are connected to a sleeved cable 141 such that movement of the cable 141 away from the frame 137 causes disengagement of the pawls 138,140. A pedal 142 is pivotally mounted on the end of the track 132. The pedal 142 is connected to the end of the cable 141 remote from the arrangement 134, such that pushing of the pedal 142 causes pulling of the cable 141 towards the arrangement 134.

The opposite end of the track 132 is mounted to a mounting arm 142 by virtue of a pin on the track 132 engaging in a longitudinal slot 146 in the arm 142. The upper end of the arm 144 is pivotally mounted on the frame 114, and the lower end mounts the auxiliary wheel 130.

The wheelchair 110 operates in a generally similar way to climb a curb 172 except as outlined below. The wheelchair 110 is pushed up to the curb 172 with the respective pawls 138 and 140 engaged. The pedals 142 are then pressed thereby pulling the cable 141 to disengage the pawls 138, 140. This allows the pedals 142 to be pushed further thereby allowing the toothed bar 139 to be pulled downwardly and the frame 137 to be pivoted forwards. As a result of the pawls 138, 140, if the pedals 142 are released the track 132 will remain locked in position.

By pushing further on the pedal 142 this will cause pivoting of the track 132 about the end of the bar 139 thereby raising the auxiliary wheels 130 to above the curb 172. The wheelchair 170 can be pushed forwards until the wheels 124 engage against the side of the curb 172. As the wheelchair 172 is pushed further forwards the wheels 124 will continue to engage against the side of the curb 172 and hence slide rearwardly along the tracks 132 until an equivalent position is reached as with the wheelchair 10 in FIG. 3. The large wheels 112 will now just about be on the curb 172. Once safely on the curb 172 the wheels 124 can be allowed to return to a conventional forward position by leaning rearwardly on the wheelchair 110 and gently pushing the pedals 142.

As noted above the frame 114 of the wheelchair 110 permits folding of the wheelchair such that the two parts 111 can be brought together. A seating arrangement 150 is provided locatable on the frame 114. The arrangement 150 comprises a padded rigid base 152 which sits on and extends between the two parts 110. Pivoted fingers 154 are provided towards each side of the base 150 on the underneath thereof. Each of the fingers 154 connects by a rigid link 156 to a handle 158 such that with the handle immediately behind the base 152 the fingers engage beneath respective lips 160 on each part 111, but if the handle 158 is pushed towards the base 152 the fingers are caused to pivot away from the lips 160 thereby permitting release of the base 152.

A rigid padded back portion 162 is provided which is pivotally mounted on each side of the base 152 by L-shaped brackets 164. A pivoted finger 166 is provided on the rear of the base 152, and when pivoted into a substantially vertical condition retains the back 162 in an upstanding position, and when in a substantially horizontal alignment allows the back 162 to be folded flat on to the base 152.

A crossbar 168 pivotally extends across the rear of the back 162 a short distance below the top thereof. Brackets 170 are provided on each end of the bar 168. The brackets 170 each mount a respective arm rest 174 and handle 118. The arm rests 170 and handles 118 are intended to always respectively point forwards and backwards and the pivotal mounting of the crossbar 168 permits these positions to be maintained whether the back 162 is upstanding or folded flat. An opening 176 is provided on each of the brackets 170. Sprung projections 178 are provided one on each side of the back 162 to be engageable in the openings 176 when the back 162 is upright to hold the brackets 170 and hence arm rests 174 and handles 118 in a correct alignment.

The frame 114 and seating arrangement 150 permit the wheelchair 110 to be quite compact when not in use, therefore being usable where only a small carrying capacity is available such as in smaller cars. The rigidity of the arrangement 150 provides a stronger and more confortable wheelchair, and helps a user to feel more secure.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A wheeled conveyance, the conveyance (10, 100) comprising a first main wheel arrangement (12, 112) which is located towards a rear of the conveyance (10, 110), characterised in that the conveyance (10, 110) also comprises a second wheel arrangement (24, 124) slidably movable between a first position in front of the main wheel arrangement (12, 112) and a second rearward position wherein the second wheel arrangement (24, 124) and is lower than the first wheel arrangement (12, 112) the first wheel arrangement is spaced from a support surface engaged by the second wheel arrangement.

2. A conveyance according to claim 1, characterised in that the conveyance (10, 110) comprises a ground engaging member (30, 130).

3. A conveyance according to claim 2, characterised in that the ground engaging member (30, 130) comprises a third wheel arrangement (30, 130) which is located towards the front of the conveyance (10, 110).

4. A conveyance according to claim 2, characterised in that the ground engaging member (30, 130) is arranged so as to be ground engageable at least when the second wheel arrangement (24, 124) is in the second position.

5. A conveyance according to any of claim 2, characterised in that the ground engaging member (30, 130) is arranged to be generally clear of the ground when the second wheel arrangement (24, 124) is in the first position.

6. A conveyance according to claim 1, characterised in that any or all of the first (12, 112), second (24, 124) and third (30, 130) wheel arrangements comprise a pair of wheels, with each of the pair located towards a respective side of the conveyance (10, 110).

7. A conveyance according to claim 6, characterised in that a respective track (32, 132) and other corresponding components are provided for each wheel (12, 112, 24, 124, 30, 130).

8. A conveyance according to claim 7, characterised in that an engagement member (36) is provided extending between a pair of actuating members.

9. A conveyance according to claim 8, characterised in that the conveyance is collapsible and a hinge (38) or other arrangement is provided in said engagement member to permit folding thereof.

10. A conveyance according to claim 1, characterised in that the conveyance (10, 110) comprises a frame (14, 114) upon which the wheel arrangements are mounted.

11. A conveyance according to claim 10, characterised in that the conveyance frame (114) comprises two frame parts (111) which are selectively braced apart in an in use condition.

12. A conveyance according to claim 11, characterised in that a seating arrangement (152) is provided which is selectively mountable on the frame (114).

13. A conveyance according to claim 12, characterised in that the seating arrangement (152) is substantially rigid at least in a transverse direction to brace the frame parts (111) apart.

14. A conveyance according to claim 12, characterised in that the seating arrangement (152) comprises a base (152), back (162), and arm rests (174), and means for retaining said seating arrangement in position relative to one another on the frame.

15. A conveyance according to claim 14, characterised in that handles (118) are integral with the arm rests (174).

16. A conveyance according to claim 12, characterised in that the seating arrangement (150) provides handles (118) for the conveyance (110).

17. A conveyance according to claim 10, characterised in that the second wheel arrangement (24, 124) is slidably mounted on a track (32, 132), which track is mounted on the frame (14, 114).

18. A conveyance according to claim 17, characterised in that the track (32, 132) is pivotally mounted on the frame (14, 114) at a point towards the front of the frame (14, 114).

19. A conveyance according to claim 17, characterised in that the track (32,132) is pivotally mounted on the frame (14, 114) as to be movable between a first position aligned generally horizontally or upwardly inclined towards the rear of the conveyance (10,110) and a second position inclined downwardly towards the rear of the conveyance (10,110).

20. A conveyance according to claim 19, characterised in that the means (52) are provided for locking the track (32) in the second position.

21. A conveyance according to claim 20, characterised in that the locking means (52) are arranged to be automatically disengaged upon the second wheel arrangement (24) reaching the second position.

22. A conveyance according to claim 21, characterised in that the locking means (52) comprises a ratchet member (56) engageable with a pivoted sprung member (58).

23. A conveyance according to claim 22, characterised in that the second wheel arrangement (24) is engageable against the sprung member (58) to cause disengagement of the locking arrangement (52).

24. A conveyance according to claim 19, characterised in that a first resilient means (62) extends between the track (32) and the frame (14) at a location on the frame (14) spaced from the pivotal mounting (28) so as to urge the track (32) towards the first condition.

25. A conveyance according to claim 19, characterised in that the second wheel arrangement (24) is urged towards to the first position.

26. A conveyance according to claim 25, characterised in that the urging of the second wheel arrangement (24) is greater when the track (32) is in the position.

27. A conveyance according to claim 19, characterised in that the second wheel arrangement (24) is connected to the frame (14) via a resilient means (64) to provide urging of said second wheel arrangement (24) towards the first position.

28. A conveyance according to claim 19, characterised in that an actuating member (34) is provided connected to the track (32), and engageable by a person pushing the conveyance (10) to move the track (32) into the second position.

29. A conveyance according to claim 28, characterised in that the actuating member (34) extends rearwardly from the conveyance (10).

30. A conveyance according to claim 28, characterised in that the actuating member (34) is operable by a person's foot.

31. A conveyance according to claim 28, characterised in that the actuating member (34) comprises a plate (36).

32. A conveyance according to claim 31, characterised in that the plate (36) is foldable.

33. A conveyance according to claim 31, characterised in that the plate (36) has a generally chevron shape in plan view.

34. A conveyance according to claim 28, characterised in that the a resilient means (64) is mounted on the actuating member (34) such that the resilient means (64) is stretched further away from a relaxed position when the track (32) is moved to the second position.

35. A conveyance according to claim 28, characterised in that an end of the second resilient means (64) spaced from the actuating member (34) slidably mounts line means which extends from a first point towards the front of the frame (14) via said slidable mounting (66) on the second resilient means (64), to a slidable mounting (68) at a second point towards the front of the frame (14), to connect to the second wheel arrangement (24).

36. A conveyance according to claim 28, characterised in that a further resilient means mounts said line means.

37. A conveyance according to claim 19 when dependent on any of claims 10 to 18, characterised in that means (46) are provided for locking the second wheel arrangement (24) in the first position.

38. A conveyance according to claim 37, characterised in that said locking means (46) is automatically actuable upon the second wheel arrangement (24) moving to the first position.

39. A conveyance according to claim 37, characterised in that the locking means (46) comprises a sprung finger (46).

40. A conveyance according to claim 37, characterised in that means (48) are provided for selectively releasing the locking means (46).

41. A conveyance according to claim 40, characterised in that said release means (48) is operable by a person pushing the conveyance (10).

42. A conveyance according to claim 41, characterised in that said release means (48) comprises line means (48) extending from the sprung finger (46) to a handle (50).

43. A conveyance according to claim 19, characterised in that the track (32) is urged towards the position.

44. A conveyance according to claim 17, characterised in that the track (132) is pivotally mounted on an arrangement (134) which is movably mounted on the frame (14, 114).

45. A conveyance according to claim 44, characterised in that the mounting arrangement (134) is pivotally mounted on the frame (114), and of variable length.

46. A conveyance according to claim 45, characterised in that a first locking means (136,138) is provided for locking the arrangement against pivotal movement on the frame (114).

47. A conveyance according to claim 46, characterised in that the first (136, 138) and a second locking means (139, 140) are operable by a foot pedal (142).

48. A conveyance according to claim 47, characterised in that said foot pedal (142) permits the track (132) to be pivoted as required.

49. A conveyance according to claim 45, characterised in that a second locking means (139,140) is provided for locking the length of the arrangement (134).

50. The wheeled conveyance of claim 1 wherein the conveyance is a wheelchair.

51. A wheelchair according to claim 50, characterised in that at least the first (12, 112) and second wheel arrangements (24, 124) respectively comprise a pair of spaced wheels.

52. A wheelchair according to claim 50, characterised in that each track (32, 132) and respective actuation member (34, 142) are coextensive.

53. A wheelchair according to claim 52, characterised in that foot rests (22) extend from the front of each of the tracks (32, 132).

54. The conveyance of claim 3, further characterised in that the ground engagement means (30, 130) comprises a pair of third wheels (30, 130), and each third wheel (30, 130) is mounted on a respective foot rest (22) to extend there beneath.

55. A wheelchair according to claim 53, characterised in that tracks (32,132) are pivotally mounted on a frame (14,114) generally at a connection between the tracks (14, 114) and the foot rests (22).

56. A wheelchair according to claim 50, characterised in that wheels of the first wheel arrangement (12, 112) are releasably mountable on the frame (14, 114).

57. A wheel chair comprising:

a) a seat and frame assembly including a main frame and a rearwardly mounted seat;

b) a spaced pair of rear wheels rotatively mounted on the frame near opposite sides of the seat;

c) a spaced pair of auxiliary wheels mounted on a forward portion of the main frame;

d) an auxiliary frame pivotally connected to the main frame and defining a pair of spaced tracks;

e) a pair of front wheel assemblies respectively moveably supported by the tracks for movement between a forward position and a rearward position; and, f) the seat and frame assembly being supported by the front and rear wheels when the front wheels are in the forward position and by the front and auxiliary wheels when the front wheels are in the rearward position.

* * * * *